(12) United States Patent
Wittmann

(10) Patent No.: US 7,591,285 B2
(45) Date of Patent: Sep. 22, 2009

(54) PIPELINE CONFIGURATION FOR THE TRANSPORT OF A LIQUID, ESPECIALLY PETROLEUM

(75) Inventor: Hans-Joachim Wittmann, Bubenreuth (DE)

(73) Assignee: Areva NP GmbH, Erlangen (DE)

( * ) Notice: Subject to any disclaimer, the term of this patent is extended or adjusted under 35 U.S.C. 154(b) by 0 days.

(21) Appl. No.: 11/937,169

(22) Filed: Nov. 8, 2007

(65) Prior Publication Data

US 2008/0110244 A1 May 15, 2008

Related U.S. Application Data

(60) Provisional application No. 60/858,288, filed on Nov. 9, 2006.

(30) Foreign Application Priority Data

Nov. 9, 2006 (DE) ............... 10 2006 053 202

(51) Int. Cl.
  *F16L 55/00* (2006.01)
  *G01M 3/08* (2006.01)
(52) U.S. Cl. .................. 138/104; 138/117; 73/49.1
(58) Field of Classification Search ............. 138/104, 138/116, 117; 73/40, 49.1
  See application file for complete search history.

(56) References Cited

U.S. PATENT DOCUMENTS

| 3,977,233 | A |  | 8/1976 | Issel |  |
| 4,735,095 | A |  | 4/1988 | Issel |  |
| 5,172,730 | A | * | 12/1992 | Driver | 138/104 |
| 5,551,484 | A | * | 9/1996 | Charboneau | 138/104 |
| 2008/0134761 | A1 | * | 6/2008 | Bryce | 73/40 |

FOREIGN PATENT DOCUMENTS

| DE | 2431907 | C3 |  | 1/1976 |
| DE | 4334550 | A1 | * | 4/1995 |
| DE | 19535399 | A1 |  | 3/1997 |
| DE | 10116496 | A1 |  | 10/2002 |
| EP | 0175219 | B1 |  | 3/1986 |

* cited by examiner

*Primary Examiner*—Patrick F Brinson
(74) *Attorney, Agent, or Firm*—Laurence A. Greenberg; Werner H. Stemer; Ralph E. Locher

(57) ABSTRACT

A pipeline configuration for the transport of a liquid, especially petroleum, contains a pipeline laid above ground, beneath which is disposed a sensor line for detection of a leak, extending along the pipeline in its longitudinal direction. The sensor line is disposed in a catchment container, fixed to the pipeline and likewise extending along it, at its lowest point. The catchment container has side edges running in the longitudinal direction and have a spacing from the outer surface of the pipeline. Inside the catchment container a device is disposed to reduce an air flow moving between the catchment container and the outer surface of the pipeline transversely to its longitudinal direction.

12 Claims, 2 Drawing Sheets

PIPELINE CONFIGURATION FOR THE TRANSPORT OF A LIQUID, ESPECIALLY PETROLEUM

CROSS-REFERENCE TO RELATED APPLICATION

This application claims the priority, under 35 U.S.C. § 119(e), of provisional application No. 60/858,288 filed Nov. 9, 2006 and of German application No. DE 10 2006 053 202.3-45, filed on Nov. 9, 2006; the prior applications are herewith incorporated by reference in their entirety.

BACKGROUND OF THE INVENTION

Field of the Invention

The invention pertains to a pipeline configuration for the transport of a liquid, wherein the liquid, especially petroleum, is transported in a pipeline laid above ground.

The occurrence of leakage in pipelines that are laid above ground, such as those carrying petroleum, can result in substantial environmental damage.

In order to be able to identify even small leaks as soon as possible and also ascertain their location, it is therefore known, for example, from published, non-prosecuted German patent application DE 43 34 550 A1, to lay a sensor mechanism beneath such a pipeline—in the 6 o'clock position—to make possible a detection of the product fluid escaping from the pipeline and at the same time measure the location of the leak. In this known device, an angle profile is placed underneath the pipeline, serving as a catchment gutter for the fluid escaping from the pipeline in event of a leak, and in which the sensor mechanism is placed, being an electrical sensor cable in the known device.

A sensor mechanism or sensor line suitable for use on such pipelines is known, for example, from European patent EP 0 175 219 B1 (corresponding to U.S. Pat. No. 4,735,095) and is formed of a carrier pipe, which is provided with a permeable layer on its outer surface, through which a substance escaping from a leak in the pipeline into the surroundings of the sensor line and being detected can diffuse. The carrier pipe is impermeable to this substance. Its wall is provided with openings so that the substance passing through the permeable layer can get into the interior of the sensor line through these openings. Such a sensor line is also known as a collector line. With a method familiar from German patent DE 24 31 907 C3 (corresponding to U.S. Pat. No. 3,977,233), the place at which the substance has made its way into the sensor line is then determined. This place corresponds to the site at which the substance has escaped from the pipeline being monitored. In this known method, using a pump hooked up to the sensor line, the substance which has penetrated into the sensor line along with a carrier gas present in the sensor line is taken to a data recorder, likewise hooked up to the sensor line, with which the substance contained in the carrier gas can be detected. If the flow rate is known, the time interval between turn-on of the pump and arrival of the substance at the data recorder can be used to determine the place at which the substance is getting into the sensor line and, thus, the site of the leak on the pipeline.

As an alternative or a supplement to the above mentioned permeable sensor line carrying a carrier gas (collection line) for the detecting and locating of leaks in pipelines, it is known, for example, from published, non-prosecuted German patent applications DE 195 35 399 A1 or DE 101 16 496 A1, how to use a light guide as the sensor line, whose transmission properties are altered locally, either directly by the substance escaping from the pipeline or by a heat of reaction produced in its surroundings as the substance escapes.

However, in the monitoring of leaks on pipelines laid above ground, especially pipelines in regions where strong winds often occur, it has proven to be a problem that the liquid emerging from the pipeline and flowing downward along its outer circumference, especially in the case of small volumes, cannot be detected with adequate certainty with a sensor line laid underneath the pipeline.

BRIEF SUMMARY OF THE INVENTION

It is accordingly an object of the invention to provide a pipeline configuration for the transport of a liquid, especially petroleum that overcomes the above-mentioned disadvantages of the prior art devices of this general type, which is a pipeline laid above ground with a sensor line disposed beneath the latter, wherein the detection of a leak at a distance from the sensor line is improved, even when leakage volume is small.

With the foregoing and other objects in view there is provided, in accordance with the invention, a pipeline configuration for transporting a liquid, including petroleum. The pipeline configuration contains a pipeline laid above ground and has an outer surface and a longitudinal direction. A catchment container is fixed to the pipeline and extends along the pipeline. The catchment container has edges running in the longitudinal direction with a given spacing from the outer surface of the pipeline. A device is disposed inside the catchment container for reducing an air flow moving between the catchment container and the outer surface of the pipeline transversely to the longitudinal direction. A sensor line for detecting leaks is disposed beneath the pipeline and extends along the pipeline in the longitudinal direction. The sensor line is disposed in the catchment container at a lowest point of the catchment container.

According to these features, a sensor line is disposed beneath the pipeline for detection of a leak, extending along the pipeline in its longitudinal direction and disposed in a catchment container, fixed to the pipeline and likewise extending along it, at its lowest point, and whose side edges running in the longitudinal direction have a spacing from the outer surface of the pipeline.

The invention is based on the understanding that the problems in detecting slight leakage volumes escaping from the pipeline outside of the 6 o'clock position are due primarily to the fact that the liquid flowing downward along the outer surface of the pipeline drips off from the pipeline before it reaches the sensor line laid underneath the pipeline in the 6 o'clock position and wets it.

Thanks to the use of a catchment container, in which the sensor line is disposed and which extends along the pipeline, with its side edges running in the longitudinal direction having a spacing from the outer wall of the pipeline, the liquid detaching itself from the outer surface of the pipeline drips into the catchment container and flows in this to its lowest point, where the sensor line is situated.

The dimensions of the catchment container transverse to the longitudinal direction of the pipeline are basically dictated by the physical properties of the outer surface of the pipeline and the liquid being detected, i.e., its flow and adhesion properties, which determine the detachment position for the liquid flowing downward on the surface of the pipeline.

The distance of the side edges of the catchment container from the outer surface of the pipeline must also be adapted to the physical properties of pipeline and liquid, in order to make sure that the liquid flowing along the outer surface of the pipeline flows into the space formed between pipeline and catchment container and does not drip off from the edge.

Thus, thanks to the measures of the invention, the liquid escaping from the pipeline during a leak outside of the 6 o'clock position makes contact with the sensor line and therefore can be reliably detected, even with low leakage rates.

Since, furthermore, a device is provided within the catchment container to reduce the air flow moving between the catchment container and the outer surface of the pipeline transversely to its longitudinal direction, it is possible to detect leaks which occur during strong wind at the side of the pipeline away from the wind (leeward), since in any case a much reduced air flow can occur along the underside of the pipeline. A pronounced air flow within the catchment container, transversely to the longitudinal direction of the pipe, would in fact result in the point of detachment or the edge of detachment being driven by the air flowing out from the catchment container between the leeward edge and the pipeline into a zone lying outside of the catchment container, during strong cross winds occurring at the leeward edge. Suitable as such devices are all structural measures which lessen the flow resistance for a crosswise current occurring inside the catchment container, for example, deflection vanes extending into the interior of the catchment container, being spaced apart in the lengthwise direction and staggered relative to each other in the transverse direction. In other words: flow obstacles disposed inside the catchment container, configured and disposed such that they do not hinder the transport of the fluid escaping during the leak to the lowest point of the catchment container.

In one advantageous embodiment of the invention, a channel to accommodate the sensor line is provided in the catchment container, extending in the longitudinal direction. This makes possible a definite positioning of the sensor line inside the catchment container.

In particular, the channel has generally vertically running sidewalls, which are provided with openings, and it divides the catchment container into two zones disposed symmetrically to the vertical midplane of the pipeline, which lead the liquid occurring during a leak from the pipeline to the channel, so that it gets into the sensor line through the openings. The sidewalls create a high flow resistance transversely to the longitudinal direction, which significantly reduces the size of a transverse flow in the space between catchment container and pipeline.

An especially high flow resistance is achieved when the channel lies against the pipeline. For this, in an especially preferred embodiment of the invention, a sealing element is inserted between a base of the channel and the outer surface of the pipeline, extending in the longitudinal direction of the pipeline.

If the catchment container is fastened to the pipeline by a clamping band embracing the latter, which is preferably led through recesses located in the sidewalls of the channel, a simple and secure retrofitted mounting of the catchment container on an already present pipeline is possible.

In an especially preferred embodiment of the invention, the channel is formed by a u-shaped molding, open at the bottom, in the catchment container, which is closed by a bottom piece at its lower end, which is fixed to the catchment container by a locking connection. Thanks to this measure it is possible, in a first installation step, to mount the catchment container, not yet closed by the bottom piece, on the pipeline before the sensor line has been introduced into the channel if the clamping band is led through the catchment container at a distance from the lower opening in the catchment container that is greater than the diameter of the sensor line. After the catchment container has been mounted, the sensor line can then be inserted from below into the channel, and it is then closed by simple pressing on and locking of the bottom piece, so that the sensor line lies definitively in the channel.

Other features which are considered as characteristic for the invention are set forth in the appended claims.

Although the invention is illustrated and described herein as embodied in a pipeline configuration for the transport of a liquid, especially petroleum, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
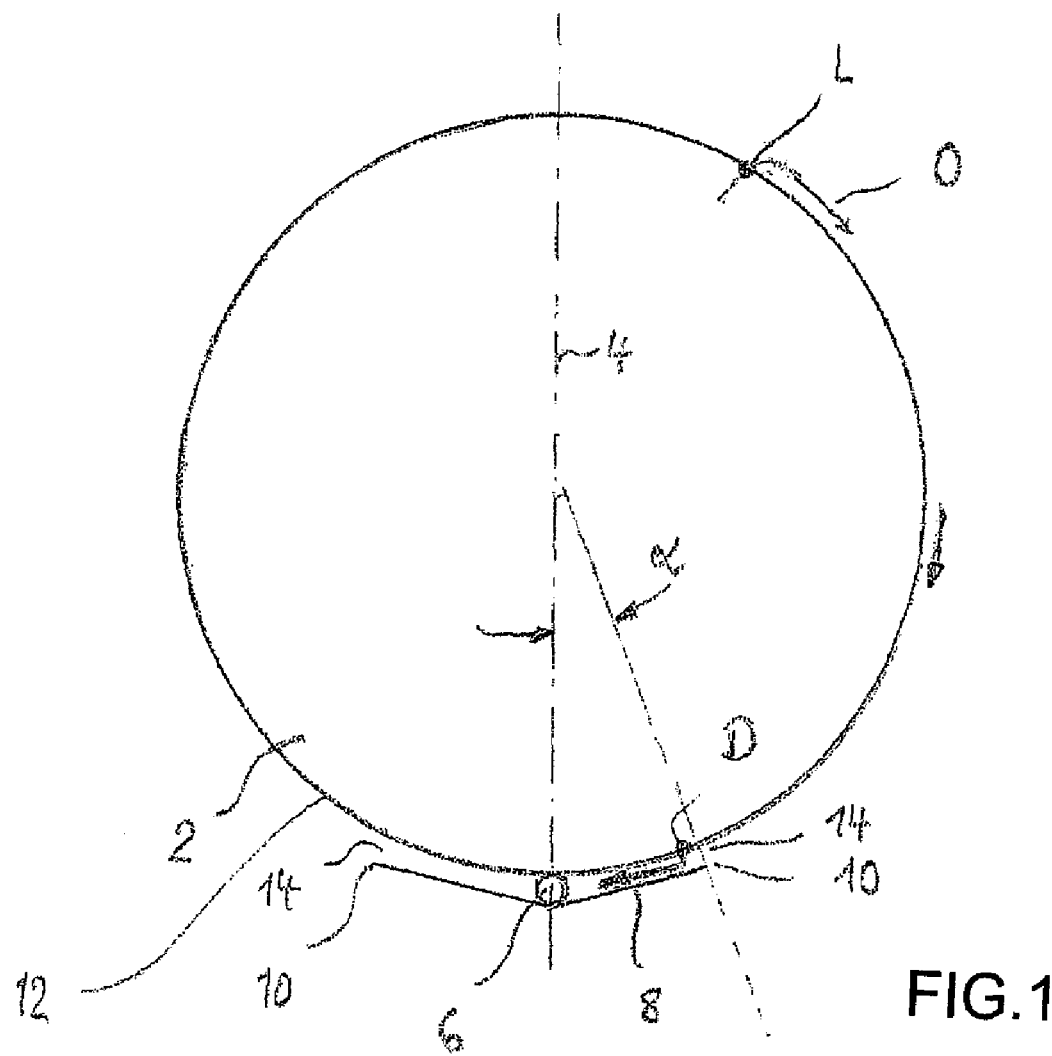
FIG. 1 is a basic schematic diagram of a pipeline configuration according to the invention.

Referring now to the figures of the drawing in detail and first, particularly, to FIG. 1 thereof, there is shown a pipeline configuration for the transport of a liquid O and contains a pipeline 2, on whose underside a sensor line 6 is disposed in the 6 o'clock position, that is, in a midplane 4 running vertically and parallel to a longitudinal direction of the pipeline 2, i.e., perpendicular to the plane of the drawing. The sensor line 6 is disposed inside a catchment container 8, disposed on the pipeline 2 and approximately v-shaped in cross section, and the sensor line 6 is situated there at its lowest point. Between side edges or margins 10 of the catchment container 8, extending in a longitudinal direction of the pipeline 2, and an outer surface 12 of the pipeline there is a gap 14, through which the liquid O emerging upon leakage and flowing along the outer surface 12, in this example, petroleum, can flow into the catchment container 8.

FIG. 1 illustrates a situation in which the liquid O emerging upon leakage at a leak site L arrives at the outer surface 12 of the pipeline 2, being located in an upper region of the pipeline 2 within the 6 o'clock position. Starting from the leakage site L, the liquid O now flows downward on the outer surface 12 by the action of gravity, whereupon the gravity exerted on the liquid is directed away from the outer surface after reaching the 3 o'clock position. Depending on the viscosity and adhesion properties of the liquid O, it runs along the outer surface 12 up to a drip point D, until the adhesion forces are no longer enough to hold the liquid O on the outer surface 12. At this point, the liquid O drips off from the outer surface 12 and arrives in the catchment container 8, as illustrated in FIG. 1, in which it then runs down to the lowest point at the 6 o'clock position and wets the sensor line 6.

The transverse dimensions of the catchment container 8, i.e., an angle range α through which the catchment container 8 extends by its edge 10, depends on the physical properties of the liquid O and the outer surface 12 of the pipeline 2 and is dimensioned so as to assure that the drip point D is located within the angle range α.

Figures 2, 3:
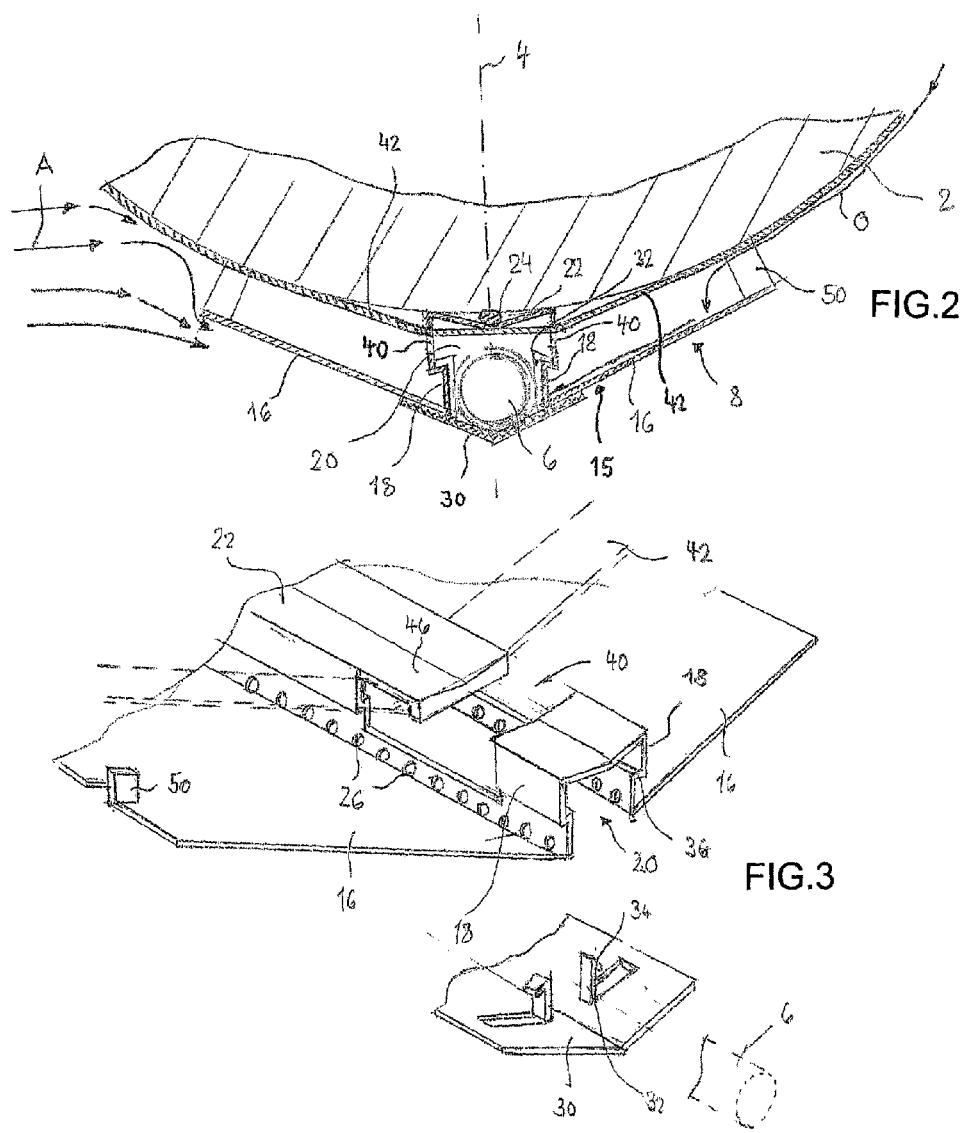
FIG. 2 is a diagrammatic, sectional view of the pipeline configuration according to the invention in a final installed condition, where a catchment container is fixed to a pipeline.
FIG. 3 is a diagrammatic, perspective view of the catchment container before being mounted on the pipeline.

In FIGS. 2 and 3 one notices that the catchment container 8 is constructed from an approximately v-shaped profile 15, having two legs 16 oriented at a slant to each other, which extend opposite each other, each starting from an approximately vertically oriented side wall 18 (in the final installed condition) of a channel 20 approximately u-shaped in cross section, formed between them, in mirror symmetry to the midplane 4. The legs 16 are tilted to the sidewalls 18 and make an acute angle with them, so that the u-shaped channel 20 is situated inside the v-shaped profile 15 formed by the legs 16.

A base 22 of the u-shaped channel 20 is provided with a molding that projects into it, in which an elastic sealing element 24 is inserted in the final installed condition, by which the base 22 of the channel 20 lies tightly against the outer surface 12 of the pipeline 2 (FIG. 2).

Per FIGS. 2 and 3, the channel 20 divides the catchment container 8 into two zones disposed symmetrically with respect to the vertical midplane 4, which convey the liquid O escaping from the pipeline 2 during a leak to the sensor line 6. The sidewalls 18 of the channel 20 are provided with openings 26 for this, though which the liquid O running down along the inside of the legs 16 gets into the interior of the channel 20.

In the final installed condition (FIG. 2), the channel 20 is closed at its lower end by a likewise v-shaped bottom piece 30, so that the liquid O getting into it through the openings 26 cannot escape downward.

The striplike bottom piece 30 shown in FIG. 3 in a condition prior to the final installation is provided with elastic locking elements 32 disposed symmetrically to the midplane 4, each of which engage by their locking dogs 34 with a shoulder or projection 36 formed in the sidewalls 18 and fix the bottom piece 30 to the catchment container 8 by form fitting and close off the channel 20 at its lower end. The locking elements 32 are ties formed from the bottom piece 30, which produce a locking or snap connection with the channel 20. Instead of a projection 36 extending in the longitudinal direction of the sidewalls 18, one can also provide projections spaced apart from each other or openings spaced apart from each other in the sidewalls 18, being disposed at the same spacing as the locking elements 32.

The sidewalls 18 of the channel 20 are provided with a recess 40 at given intervals, through which a clamping band 42 can be led, which reaches under the base 22 and embraces the pipeline 2 so that the catchment container 8 is fixed onto it. In order to enable an easier introducing of the clamping band 42 into the recess 40, the base 22 is interrupted in the region of the recess 40, so that the clamping band 42 can be led beneath a L-shaped projection 46 sticking out beyond the side recess 40.

A plurality of ties 50 are formed from the legs 16, standing vertically on the legs 16, pointing into the interior of the profile 15, and serving as spacers from the outer surface 12 of the pipeline 2.

The installation of the catchment container 8 is done in that first the sealing element 24, such as a sealing compound or an elastic sealing tape, is introduced into the depression formed by the molding of the base 22. Next, the profile 15 is mounted on the pipeline 2 in the 6 o'clock position, the clamping band 42 is introduced into the recess 46 and the profile 15 is fixed to the pipeline 2. In this stage of the installation, the channel 20 is open at its lower end. The sensor line 6 is now introduced into this channel 20 from underneath, it being preferably a sensor line such as is known, for example, from the initially cited European patent EP 0 175 219. After installing the sensor line 6, the channel 20 is closed with the bottom piece 30.

The sidewalls 18 of the channel 20, the sealing element 24 serving generally only to even out irregularities in the outer surface 12 of the pipeline 2, and the sensor line 6 laid inside the channel 20 have the effect that an air flow A impacting the pipeline 2 from the side does not move through the catchment container 8, but instead moves past its lower end, as is illustrated in FIG. 2 at left. The occurrence of such a cross flow inside the catchment container 8 is significantly reduced, since the openings 26 disposed at the lowest point of the catchment container 8, which are in any case small, and the recesses 40 made only at rather large intervals do not allow for a pronounced cross flow. Furthermore, such a cross flow is also hindered by the sensor line 6 disposed in the channel 20. In this way, the drip point D on the leeward side is prevented from wandering outward, so that the liquid O running off at the leeward side of the outer surface 12 drips into the catchment container 8 even during strong cross winds.

The invention claimed is:

1. A pipeline configuration for transporting a liquid, including petroleum, the pipeline configuration comprising:
   a pipeline laid above ground and having an outer surface and a longitudinal direction;
   a catchment container fixed to said pipeline and extending along said pipeline, said catchment container having edges running in said longitudinal direction with a given spacing from said outer surface of said pipeline;
   a device disposed inside said catchment container extending longitudinally along said pipeline for reducing an air flow moving between said catchment container and said outer surface of said pipeline transversely to said longitudinal direction; and
   a sensor line for detecting leaks disposed beneath said pipeline and extending along said pipeline in said longitudinal direction, said sensor line disposed in said catchment container at a lowest point of said catchment container.

2. The pipeline configuration according to claim 1, wherein said catchment container has a channel for accommodating said sensor line, said channel extending in said longitudinal direction.

3. The pipeline configuration according to claim 2, wherein said channel has generally vertically disposed sidewalls with openings formed therein, said channel dividing said catchment container into two zones disposed symmetrically to a vertical midplane of said pipeline, said zones lead the liquid occurring during a leak from said pipeline to said channel.

4. The pipeline configuration according to claim 2, wherein said channel lies against said pipeline.

5. The pipeline configuration according to claim 4,
   wherein said channel has a base; and
   further comprising a sealing element inserted between said base of said channel and said outer surface of said pipeline, extending in said longitudinal direction of said pipeline.

6. The pipeline configuration according to claim 2,
   wherein said channel is a u-shaped molding having a bottom with an opening formed therein; and
   further comprising a bottom piece closing said catchment container on a lower end, said bottom piece having a locking connection for connecting to said catchment container.

7. The pipeline configuration according to claim 1, wherein the reduction of the transverse air flow occurs at least substantially along the entire length of the pipeline.

8. A pipeline configuration for transporting a liquid, including petroleum, the pipeline configuration comprising:
a pipeline laid above ground and having an outer surface and a longitudinal direction;
a catchment container fixed to said pipeline and extending along said pipeline, said catchment container having edges extending in said longitudinal direction at a given spacing from said outer surface of said pipeline;
said catchment container being configured longitudinally along said pipeline to reduce an air flow moving and not allow pronounced air flow between said catchment container and said outer surface of said pipeline transversely to said longitudinal direction; and
a sensor line for detecting leaks disposed beneath said pipeline and extending along said pipeline in said longitudinal direction, said sensor line disposed in said catchment container at a lowest point of said catchment container.

9. The pipeline configuration according to claim 8, wherein said catchment container has a lower end, and said catchment container is configured to move the air flow past said lower end.

10. A pipeline configuration for transporting a liquid, including petroleum, the pipeline configuration comprising:
a pipeline laid above ground and having an outer surface and a longitudinal direction;
a catchment container fixed to said pipeline and extending along said pipeline, said catchment container having edges running in said longitudinal direction with a given spacing from said outer surface of said pipeline and a channel extending in said longitudinal direction for accommodating a sensor line;
said channel having generally vertically disposed sidewalls with openings formed therein and dividing said catchment container into two zones disposed symmetrically to a vertical midplane of said pipeline, said zones leading the liquid occurring during a leak from said pipeline to said channel;
a device disposed inside said catchment container for reducing an air flow moving between said catchment container and said outer surface of said pipeline transversely to said longitudinal direction; and
said sensor line for detecting leaks disposed beneath said pipeline and extending along said pipeline in said longitudinal direction, said sensor line being disposed at a lowest point in said catchment container.

11. The pipeline configuration according to claim 10, further comprising a clamping band fastening said catchment container to said pipeline, said clamping band embracing said pipeline.

12. The pipeline configuration according to claim 11, wherein said sidewalls of said channel have a recess formed therein through which said clamping band is led.

* * * * *